(12) United States Patent
Peterffy et al.

(10) Patent No.: US 8,024,253 B2
(45) Date of Patent: Sep. 20, 2011

(54) INTER-MARKET SMART-ROUTING FOR COMBINATION SPREAD ORDER TRADING

(75) Inventors: Thomas Pechy Peterffy, Greenwich, CT (US); Milan Galik, Norwalk, CT (US)

(73) Assignee: Interactive Brokers LLC, Greenwich, CT (US)

( * ) Notice: Subject to any disclaimer, the term of this patent is extended or adjusted under 35 U.S.C. 154(b) by 376 days.

(21) Appl. No.: 11/507,807

(22) Filed: Aug. 21, 2006

(65) Prior Publication Data

US 2007/0118457 A1    May 24, 2007

Related U.S. Application Data

(60) Provisional application No. 60/709,456, filed on Aug. 19, 2005.

(51) Int. Cl.
*G06Q 40/00*    (2006.01)
(52) U.S. Cl. .......................... 705/37; 705/36 R
(58) Field of Classification Search ............. 705/37, 705/36 R
See application file for complete search history.

(56) References Cited

U.S. PATENT DOCUMENTS

| | | | | |
|---|---|---|---|---|
| 5,305,200 A | * | 4/1994 | Hartheimer et al. | 705/37 |
| 7,113,924 B2 | * | 9/2006 | Fishbain | 705/37 |
| 7,437,325 B2 | * | 10/2008 | Kemp et al. | 705/37 |
| 7,565,313 B2 | * | 7/2009 | Waelbroeck et al. | 705/37 |
| 7,818,246 B2 | * | 10/2010 | Cushing et al. | 705/37 |
| 7,844,539 B2 | * | 11/2010 | Smith | 705/37 |
| 7,904,380 B2 | * | 3/2011 | Herz | 705/37 |
| 2004/0236614 A1 | * | 11/2004 | Keith | 705/4 |
| 2006/0235785 A1 | * | 10/2006 | Chait et al. | 705/37 |
| 2010/0217703 A1 | * | 8/2010 | Burns et al. | 705/37 |
| 2010/0293110 A1 | * | 11/2010 | Rosenthal et al. | 705/36 R |
| 2011/0119172 A1 | * | 5/2011 | Alsberg et al. | 705/37 |

OTHER PUBLICATIONS

Epinions.com "Datek Review (incl. a trick avoid some commissions)", Available Aug. 30, 2000.*

* cited by examiner

*Primary Examiner* — Narayanswamy Subramanian
*Assistant Examiner* — Ryan D. Donlon
(74) *Attorney, Agent, or Firm* — McDermott Will & Emery LLP (57) ABSTRACT

Techniques for creating a complex order and routing the complex order to one or more exchanges to achieve optimal pricing without exposing the customer to the conventional legging risks associated with the trading of complex orders are provided. The trading system of the present disclosure provides this mechanism by routing the order to obtain the best possible price (see FIG. 4) and by accepting the risk of a partially executed order where one leg is executed and the other is not (see FIG. 5).

28 Claims, 12 Drawing Sheets

EXAMPLE 4
ACCEPTING LEGGING RISK FOR NON-EXECUTED LEG B

EXAMPLE 1
SAME TRADING VENUE

FIG. 1

EXAMPLE 2
DIFFERENT TRADING VENUES

INTER-MARKET SMART-ROUTING FOR COMBINATION SPREAD ORDER TRADING

RELATED APPLICATIONS

The present application claims priority to U.S. patent application Ser. No. 60/709,456 filed Aug. 19, 2005, the disclosure of which is incorporated herein by reference in its entirety.

TECHNICAL FIELD

This disclosure relates generally to trading combination spread orders, and more particularly, to techniques for creating, routing and executing complex orders in derivative instruments comprised of options on stocks, futures contracts, options on futures or underlying assets such as equities, certain commodities and exchange traded funds ("ETFs") as well as combinations thereof.

BACKGROUND

A complex order (or a combination order) is a trade combining two or more instruments, such as a derivative or an underlying asset (e.g. stock) that are to be traded at the same time, in the same related quantity and at a price set as a certain ratio or a spread between such instruments—hence a combination order. The purpose of such trade is to pursue a certain specific strategy, such as risk mitigation, or a specific speculative trading strategy, and, therefore, such combination trade is valuable only in as much as it is executed at the same time and with a predetermined relationship between its component parts. A partially executed combination trade where one leg of a transaction is executed and the other one is not, will not serve the intended purpose, and, in fact can dramatically increase the risk of trader's overall trading strategy. An example of a complex order is the buying of one option and the selling of another option at the same time with respect to the same underlying instrument, such as IBM stock. Each component of a complex order is referred to as a "leg." For convenience, a complex order may be quoted in the marketplace as a difference between the leg prices (the "spread").

Figure 1:
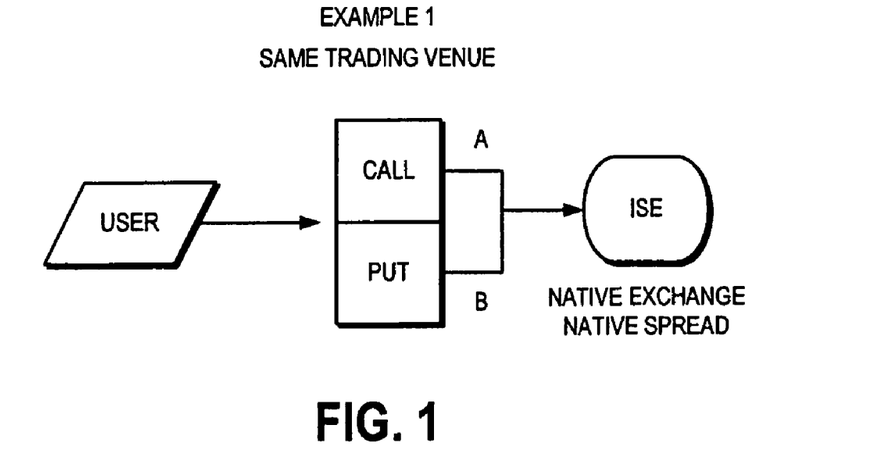
FIG. 1 illustrates an example having the same trading venue.

An exchange, such as International Securities Exchange (ISE) can execute a complex options trade natively (i.e., within the same exchange by executing both legs of the combination transaction simultaneously) (see FIG. 1). A drawback of this approach, however, is that the customer may receive sub-optimal pricing for the trade, or may not be able to execute one of the legs of the transaction if for some reason the trade becomes unmarketable. In such a situation, different trading venues can be used, with each of the legs executing separately (see FIG. 2). The U.S. has a multi-listed, distributed trading environment in which several exchanges may trade the same underlying instruments (e.g. IBM stock and derivative instruments with respect thereto) (see FIG. 3). In this trading environment, a trader who wants to achieve the best possible price may want to buy one option from a first exchange and sell the other option on another exchange, thus not trade on a native exchange but rather trade inter-market. Of course, although it offers arbitrage opportunities and a higher liquidity of a better price, the inter-market strategy is more risky because the likelihood that both legs of the transaction may not become executed simultaneously increases.

Conventionally, a multiple exchange type of trade can only be accomplished via separate trades at the various exchanges with respect to separate legs of the same combination transaction. One drawback of executing separate trades in order to implement a complex order is that the trader accepts a "legging risk." More specifically, the trader accepts the risk that the market conditions may change before each and every leg of the complex order can be filled. For example, if only the first leg of a two-leg complex order can be filled (e.g., a call option), then the trader must accept the completion of the first leg without the accompanying second leg (e.g., the put option that was designed to limit trader's potential market risk) (see FIG. 2).

What is needed are techniques for creating a complex order and routing the complex order to one or more exchanges to achieve optimal pricing without exposing the customer to the conventional legging risks associated with the trading of complex orders. The trading system of the present disclosure provides this mechanism by smart routing the order to obtain the best possible price (see FIG. 4) and by accepting the ultimate risk of partially executed order where one leg is executed and the other is not (see FIG. 5).

SUMMARY OF THE INVENTION

Embodiments of the present disclosure have the following characteristics (summarized in FIG. 6 and FIG. 7): (i) it allows the system to scan the entire market for best possible price for both legs of the trade as opposed to relying on the native exchange (this may be referred to as "smart routing") (see FIG. 3 and FIG. 8); (ii) it allows the trader to eliminate the risk of partial execution of the combination order (such as having one leg executed but not the other), so that the trader is not charged any fees for partially executed trades—i.e., all-or-nothing execution (see FIG. 6 and FIG. 8); (iii) it allows to price the combination order as a spread on both legs of the trade (i.e., the net price) which facilitates for the system to calculate the native spread and the implied spread (see FIG. 8); (iv) it allows partial execution of both legs, e.g., executing one half of each leg (see FIG. 8); (v) executed trades may be placed in separate accounts depending on the nature of the asset, e.g., securities will be placed in the securities account, options will be placed in the options account and the futures contracts will be placed in the futures accounts, which makes it easier for the trading system to ensure regulatory compliance per each instrument in trader's universal account (see FIG. 8); (vi) pre-designed drop-down menus allow traders to pick a set type of a combination order, or, alternatively, allow a trader to select a certain strategy while the trading system will design the specific transaction for the trader (see FIG. 9); (vii) it has detailed procedures for routing the combination order to the native exchange, or if such native exchange is not available, to the entire market as a whole with a specific pecking order routine to determine how each type of leg is being submitted for execution ("legging-in"), e.g., specifying that high-delta (i.e., risky legs are routed first and that large orders are not routed all at the same time) (see FIG. 10); (viii) the trading system assists the trader in specifying the multiplier that is conventionally used with trading specific derivative instruments (see FIG. 11); and, (ix) the owner/operator of the trading system agrees to take the risk of a partially executed order on its books (e.g. an error account) with no detrimental effect to the customer trader's account, such failed trades are merely considered unfulfilled or cancelled trades with respect to a customer trader (see FIG. 8). An embodiment of a computer implementation is shown in FIG. 12.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

CONCISE DESCRIPTION OF THE EMBODIMENTS

Detailed Description of the Embodiments

The present invention is now described more fully with reference to the accompanying figures, in which several embodiments of the invention are shown. The present invention may be embodied in many different forms and should not be construed as limited to the embodiments set forth herein. Rather, these embodiments are provided so that this disclosure will be thorough and complete and will fully convey the invention to those skilled in the art. Additionally, the disclosure of the U.S. Patent Application of Thomas Pechy Peterffy et al., Ser. No. 10/465,827, entitled "System for Managing Multiple Types of Accounts Having Different Regulatory Requirements" is hereby incorporated by reference in its entirety.

A. System Overview

The present disclosure provides a trader (i.e., a client or user of a trading system) a method of creating an inter-market combination product (combo), receiving market data, placing orders, executing orders, obtaining the best possible price available in the market by using a smart routing method, and viewing the execution results.

The combo can be composed of any United States exchange traded stock, option, ETF and futures contract legs with the same or different underlying, and with the same or different underlying instrument, ratio, and side (buy or sell) for each component product (leg). The client-created combo can be traded on an exchange which has native combo support (native combo exchange where both legs of the same combo order can be traded simultaneously). It can also be a combo for which no exchange trades it but which separate legs can be executed on separate exchanges. The system can handle both types of complex orders seamlessly.

FIG. 1 illustrates an example having the same trading venue—i.e., a native exchange. In this example, a user enters a complex order including both a call (leg A) and a put (leg B) on a particular underlying instrument. That is, the user intends for leg A and B to be executed simultaneously at a particular net price (i.e., native spread). The complex order is placed by the trader and routed to the native exchange (ISE in this example) for execution. In this example, the exchange natively handles the type of complex order that the user has requested, and the order is executed.

Figure 2:
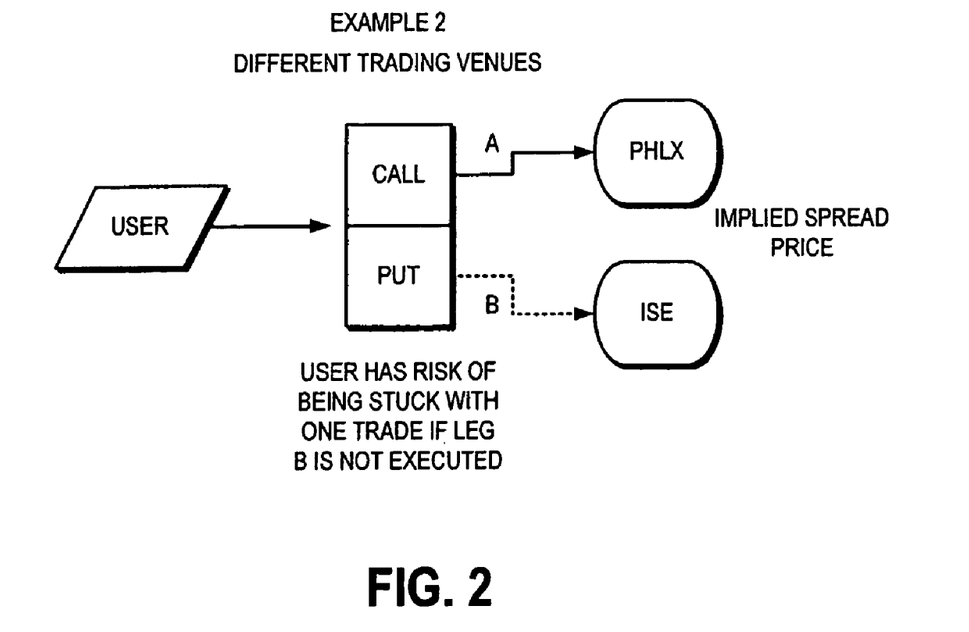
FIG. 2 illustrates an example having different trading venues.

FIG. 2 illustrates an example having different trading venues. In this example, a user enters a complex order including both a call (leg A) and a put (leg B) on a particular underlying instrument (or set of instruments). In this example, however, there is no native exchange that can handle this combo order and therefore different trading venues are used to execute the complex order. In this situation, the user accepts a legging risk. More specifically, the trader accepts the risk that the market conditions may change before each and every leg of the complex order can be filled. For example, if only leg A can be filled then the trader must accept the completion of the leg A without the completion of leg B. When a combo order must be separated into two separate legs, instead of calculating a native spread, an implied spread price is calculated instead.

Figure 3:
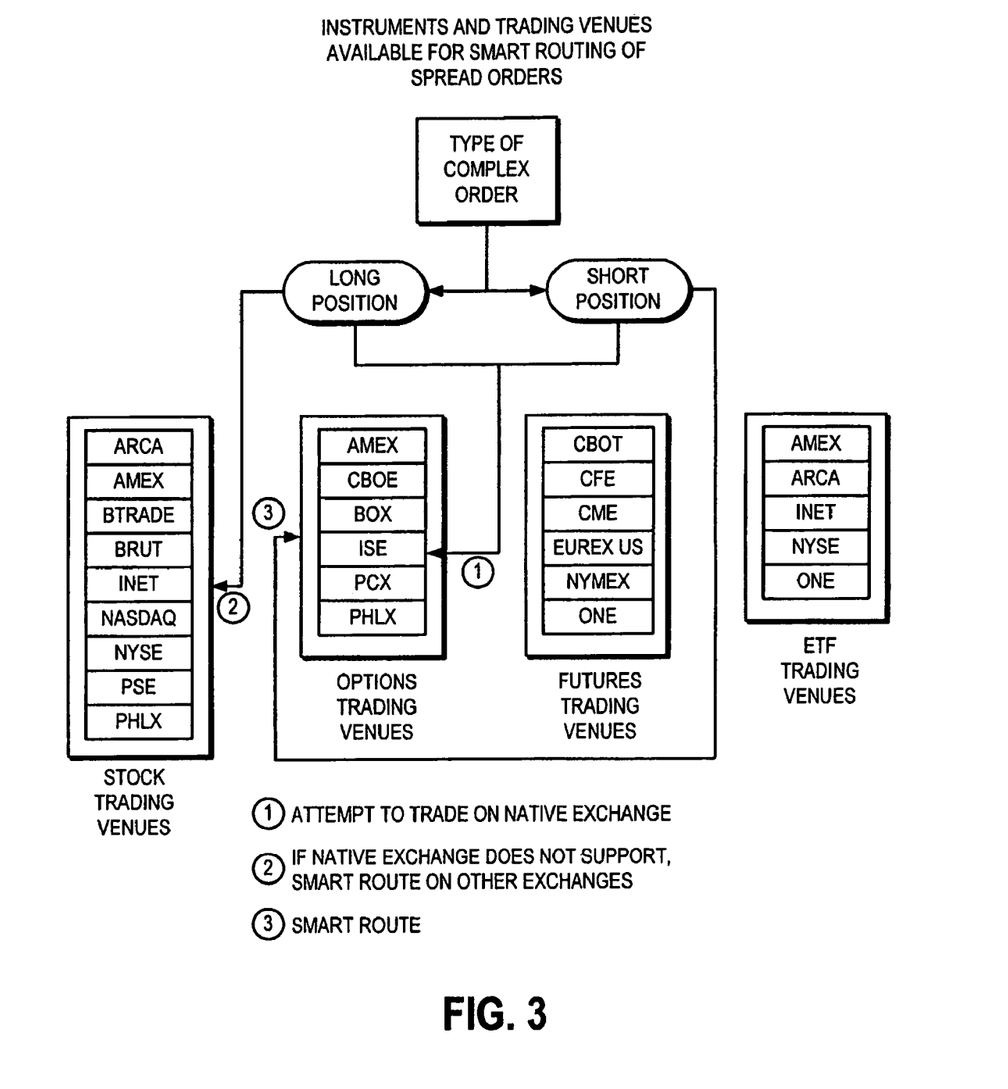
FIG. 3 illustrates instruments and trading venues available for smart routing of spread orders.

FIG. 3 illustrates instruments and trading venues available for smart routing of spread orders. The fundamental concept behind this invention is that a given instrument, such as an option on IBM stock can be traded on multiple trading venues, which accordingly means that the trading prices established on each of these exchanges will be different. Accordingly, by scanning the prices for a given instrument, a trader may identify the best price possible for a given instrument. Smart routing technology does just that. As this example illustrates, a combination order (1) may be placed on ISE to be executed on one single exchange (that will be native). Or, if such execution is not possible, the combination order will be split up into two legs and each of the legs will be routed to a separate exchange where a given leg can trade at the best possible price. This figure also provides an overview of possible trading venues of various instruments that can be component parts of a combination order, such as stocks, options, futures contracts and ETFs.

Figure 4:
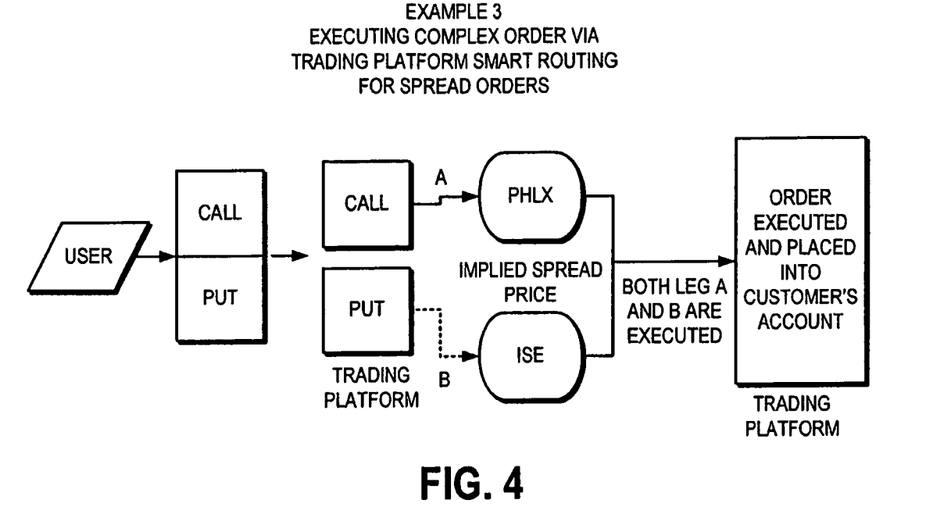
FIG. 4 illustrates an example of executing a complex order via smart routed trading platform.

FIG. 4 illustrates an example of executing a complex order via smart routed trading platform via the trading system. If a trader designs and trades a combination order through the trading system, the trader does not need to separately place the different legs of the combination order on different trading venues. The smart routing feature of the trading system will do this for the trader. Moreover, the trading system will calculate the implied price and will route to a trading venue where the best possible price can be obtained. In this example, the order is executed successfully on two separate trading venues and placed into the trader's account as a combination order—i.e., as a single trade. The trader will be only charged if the trade is successfully executed.

Figure 5:
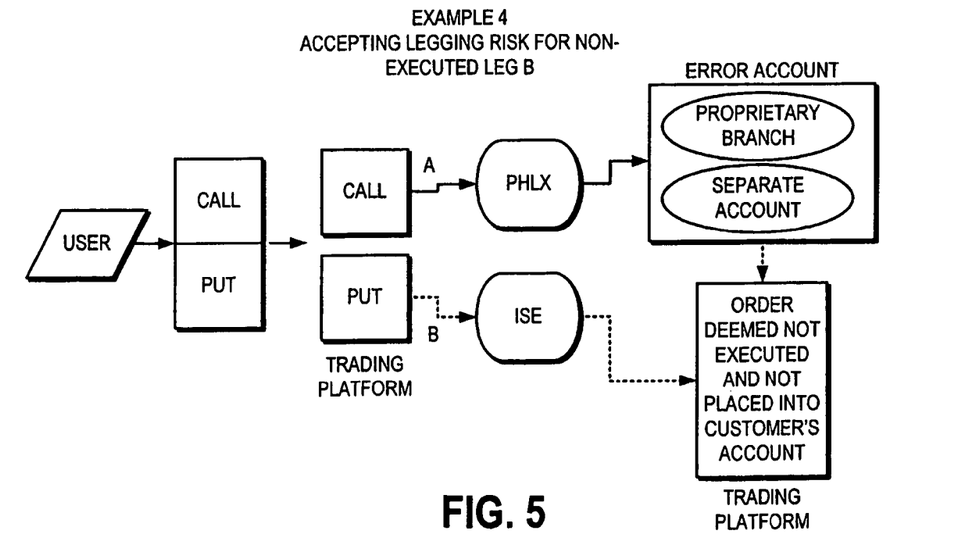
FIG. 5 illustrates an example of accepting legging risk for non-executed legs.

FIG. 5 illustrates an example of accepting legging risk for non-executed legs. In this example, after failing to place the combination trade on a native exchange, the trading system after splitting the legs of an order also failed to execute one of the legs (B) on any of the available exchanges. Because the combination order has not been executed in full, the trader is not charged for the failed order and has no further liability with respect to such order. The order that the owner of the trading system has already executed will be transferred to its affiliate for hedging or canceling.

Figure 6:
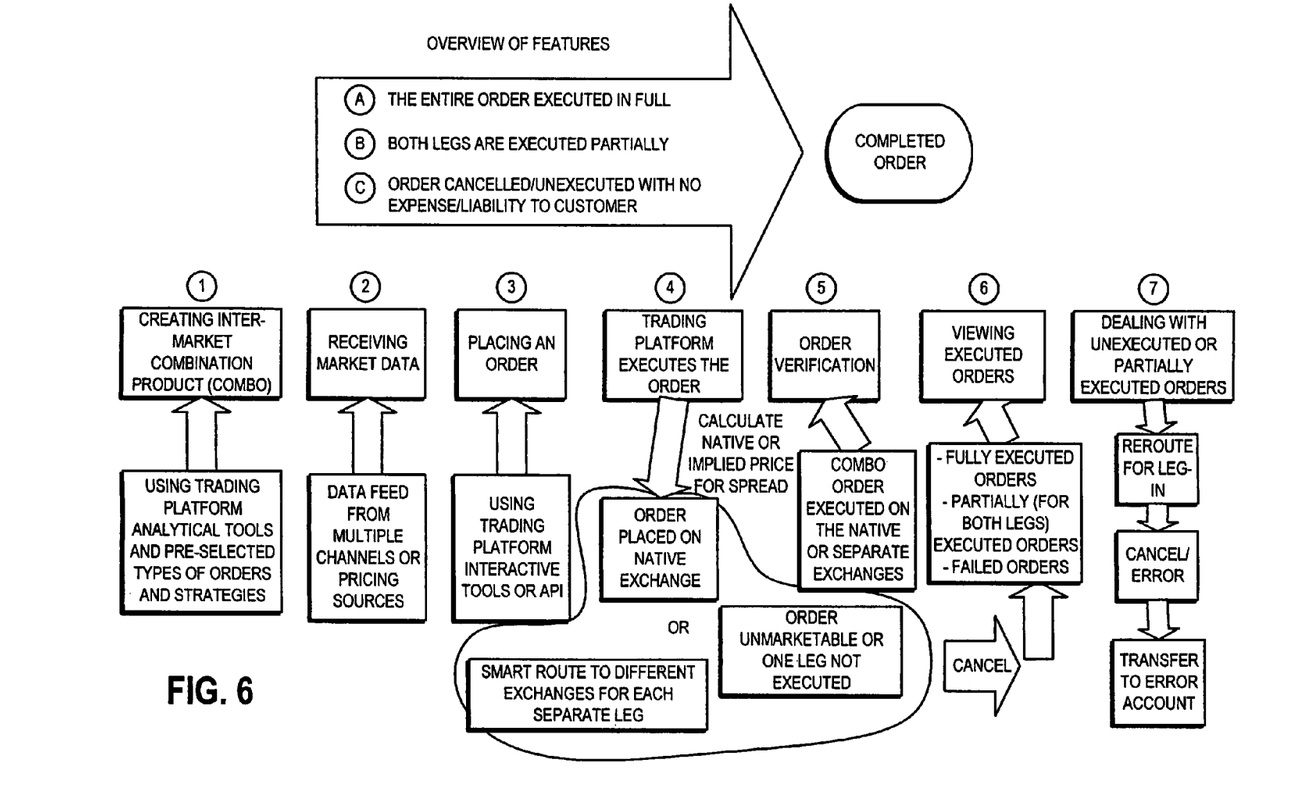
FIG. 6 illustrates an overview of the features of an embodiment of the present disclosure.

FIG. 6 illustrates an overview of the features of an embodiment of the present disclosure. This figure describes the steps involved from the designing a combination order to its final execution. First, a trader designs a combination order on the traders work station (the "TWS"). There are many analytical tools available to a traders in addition to certain pre-designed mechanisms for trading. Second, the trading system allows the trader to continuously view how the bid or the ask on a given product is quoted and evaluate the market conditions. Third, after the trader was able to view the relevant current market's conditions, and after the trader designed a combo order, the trade can be placed on the TWS as a single trade as opposed to multiple trades involving the separate legs of the same trade. Fourth, the trading system attempts to execute the order first at the native exchange, and if such execution is not possible, the combo order will be split into its component parts (e.g., a combo order involving two legs will be split into two legs) and routed for execution to various other trading venues where the subject instrument (such as an option, a stock, a futures contract or an ETF) is traded. Fifth, the order is verified, and sixth, the results of the order are displayed on the trader's TWS and placed into separate accounts, such as traded options are reflected in the options account, and the stocks will be reflected in the equity securities account. Seventh, if a combo order was only executed partially, i.e., 50% of each leg, the order will be considered executed and will be reflected on the TWS. However, if an order was only executed with respect to only one leg of the trade, e.g., an option, and not the other leg, e.g., a stock, then the order is not deemed executed and the trader will not see the order executed on TWS. In such situation, the owner of the trading system will take the partially executed order and book it out with its subsidiary.

Figure 7:
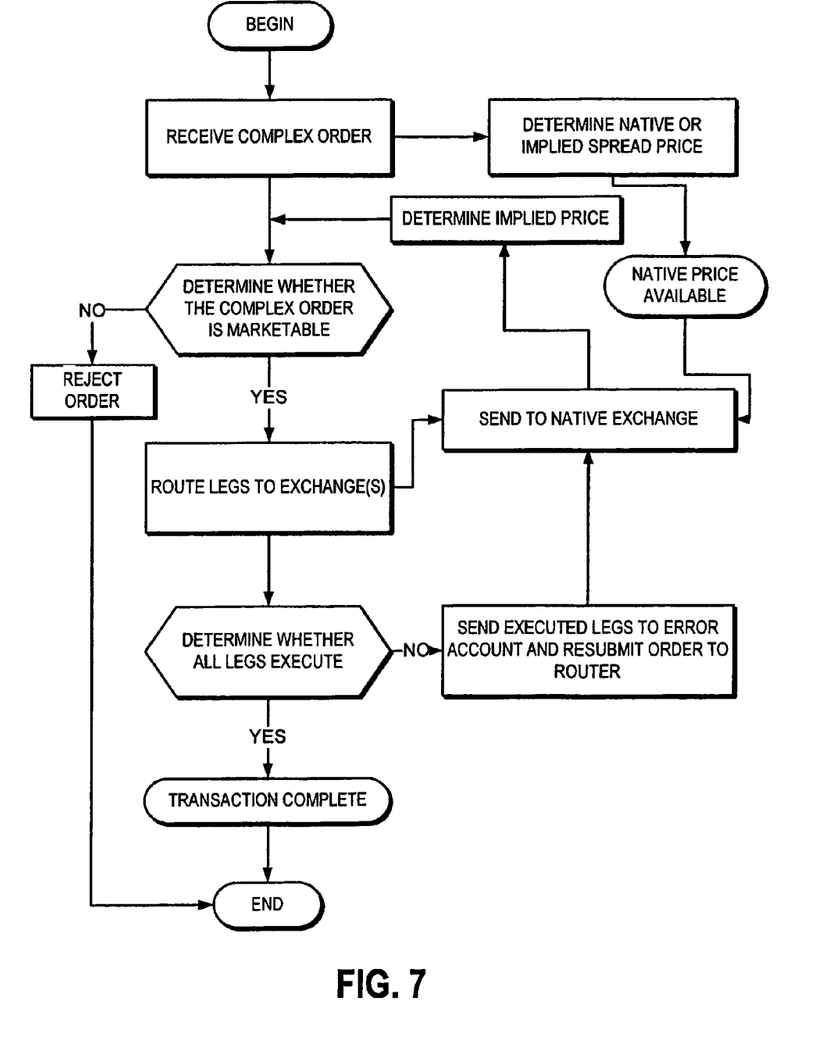
FIG. 7 illustrates a trading system overview method.

FIG. 7 illustrates a trading system overview method. This example provides a more detailed algorithm of the procedures for executing a combo trade and the steps involved in executing an order or rejecting such order.

Figure 8:
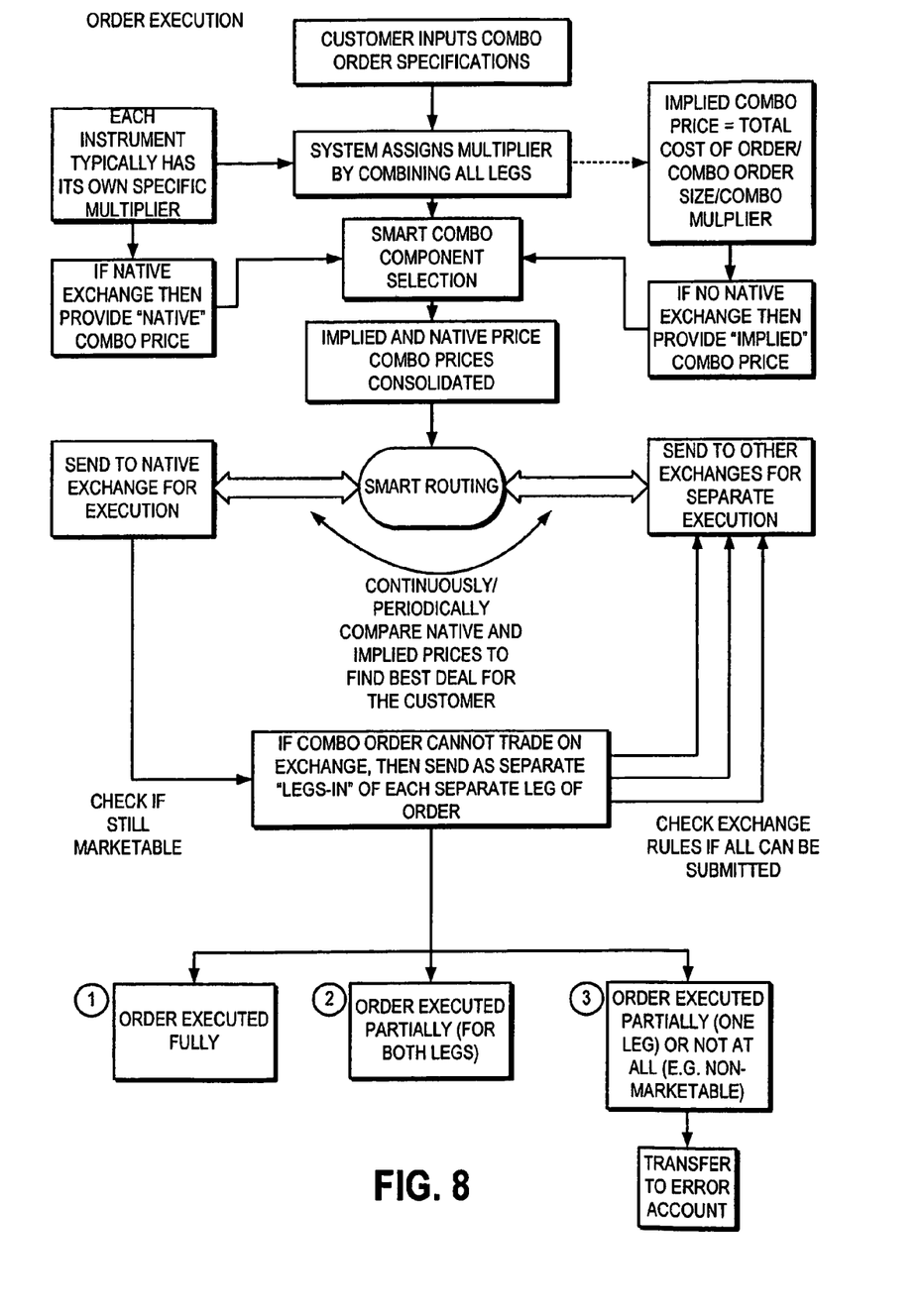
FIG. 8 illustrates an order execution method.
Figure 9:
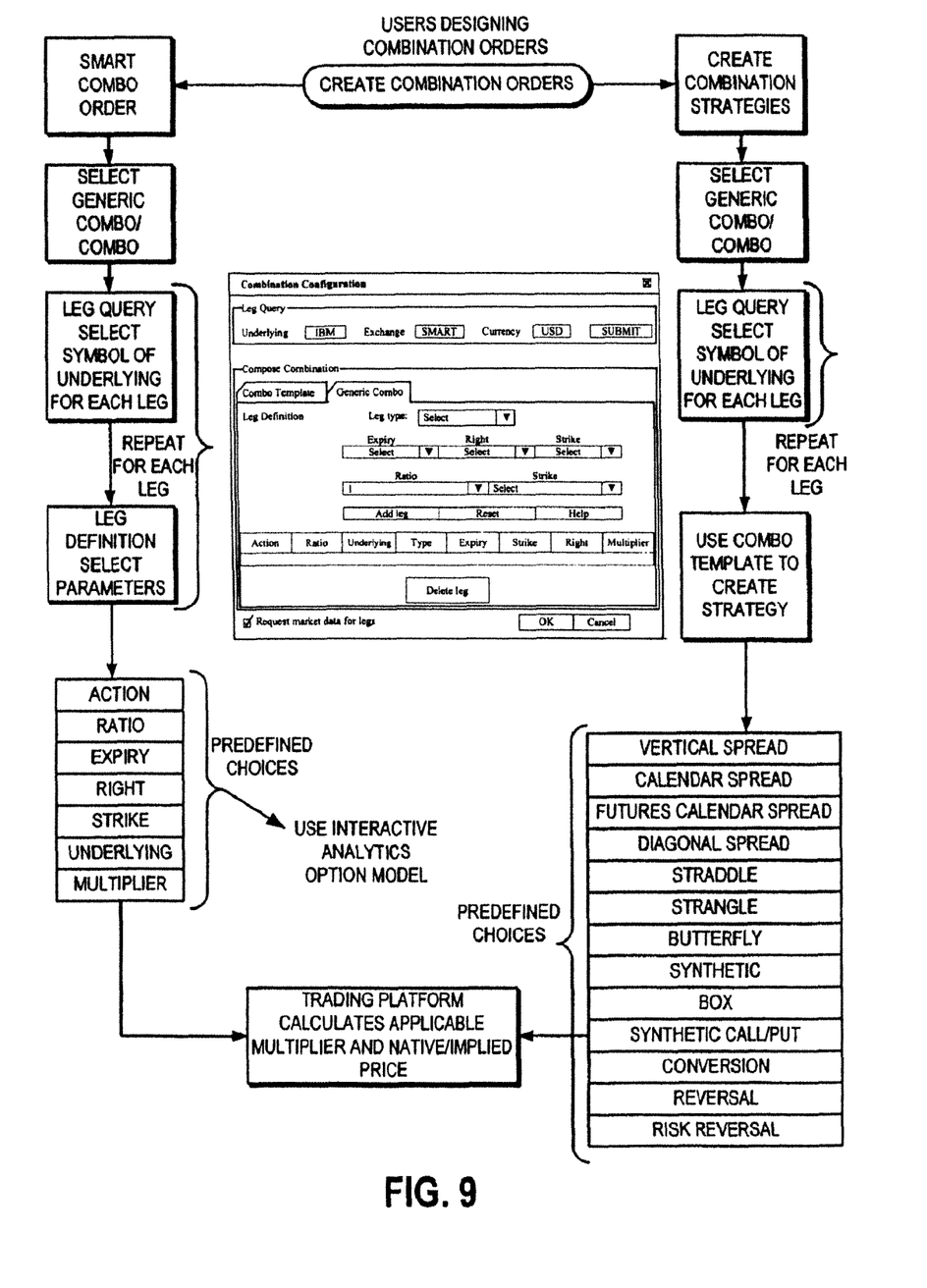
FIG. 9A illustrates a user interface for creating a combination order and FIG. 9B is an enlarged view of the user interface of FIG. 9A.

FIG. 8 illustrates an order execution method. This diagram details the procedures for executing a combination order. These steps involve assigning the right multiplier to a combo trade. A multiplier is a commonly assigned numeric value to a derivative instrument because such instrument represents only obligations and rights reflecting but not equal to obligations and rights of the underlying instrument. For example, a multiplier with respect to a stock, which is not a derivative is 1, while a multiplier typical of an option, which is a derivative is 100. A multiplier with respect to a futures contract could be a 1000. The challenge for the trading system is to assign a joint multiplier that sufficiently reflects the risk (or rather the leverage) of the derivative as a combination of two or more legs. Next, the trading system would calculate the native spread if a combination order can be traded on a native exchange or an implied spread value, if a combination order will have to be smart routed to other exchanges for possible execution. After these numerical values are assigned to the combo trade, i.e., it is priced, it can be routed for execution to the native exchange, or to other exchanges. As discussed above, the smart routing technology allows the trading system to scan multiple trading venues where the same instrument is traded and obtain the best possible price for the trader. The "legging-in" process describes the procedures for routing the combination order from a native exchange if it cannot be executed there. Finally, the diagram shows the three possible outcomes of the completed order, i.e., the order being fully executed, of the order being executed partially (for both legs) and the order being executed only with respect to only one leg or not executed at all, in which case the order is not considered executed with respect to a trader.

Figure 9A:
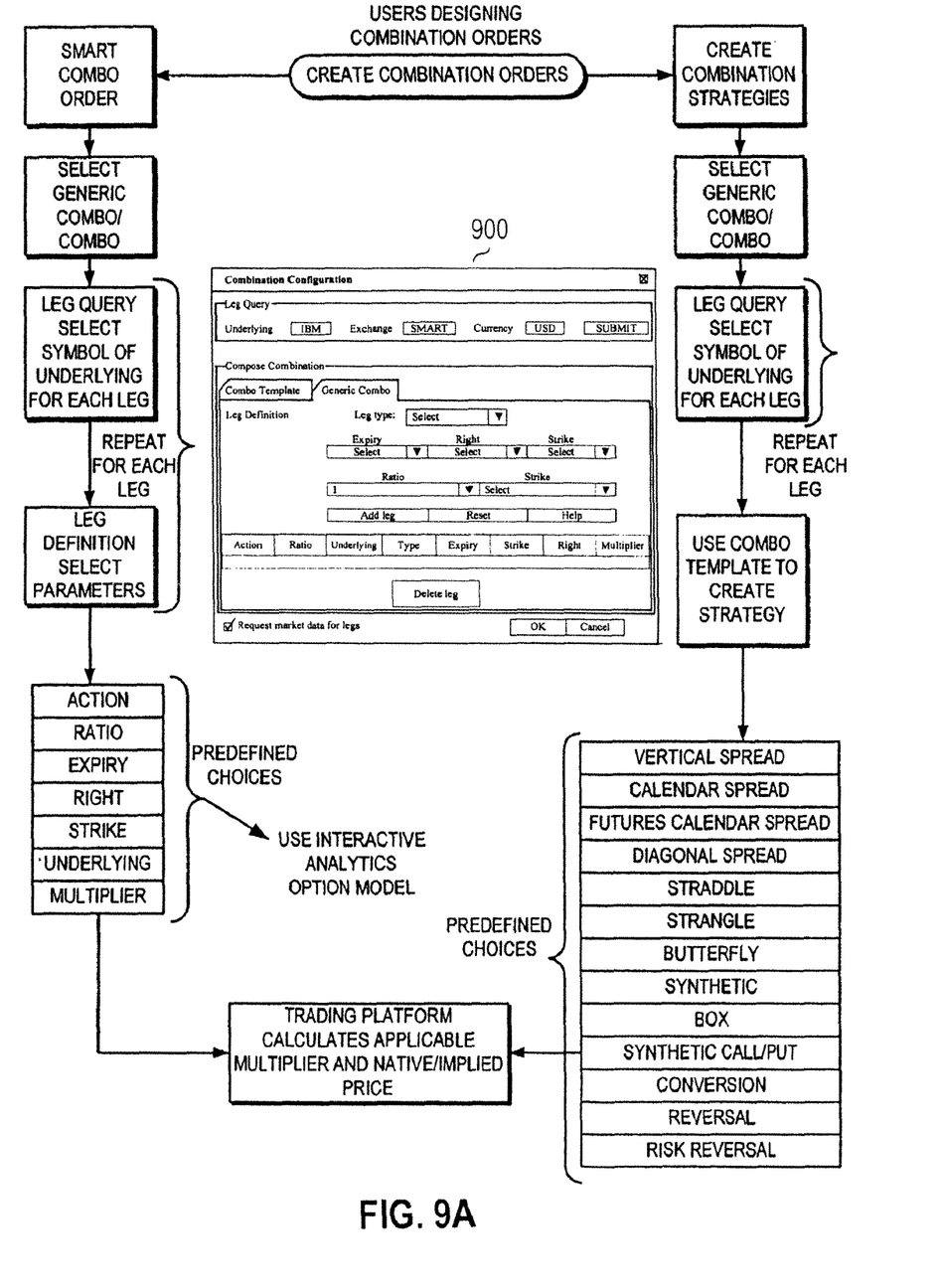
Figure 9B:
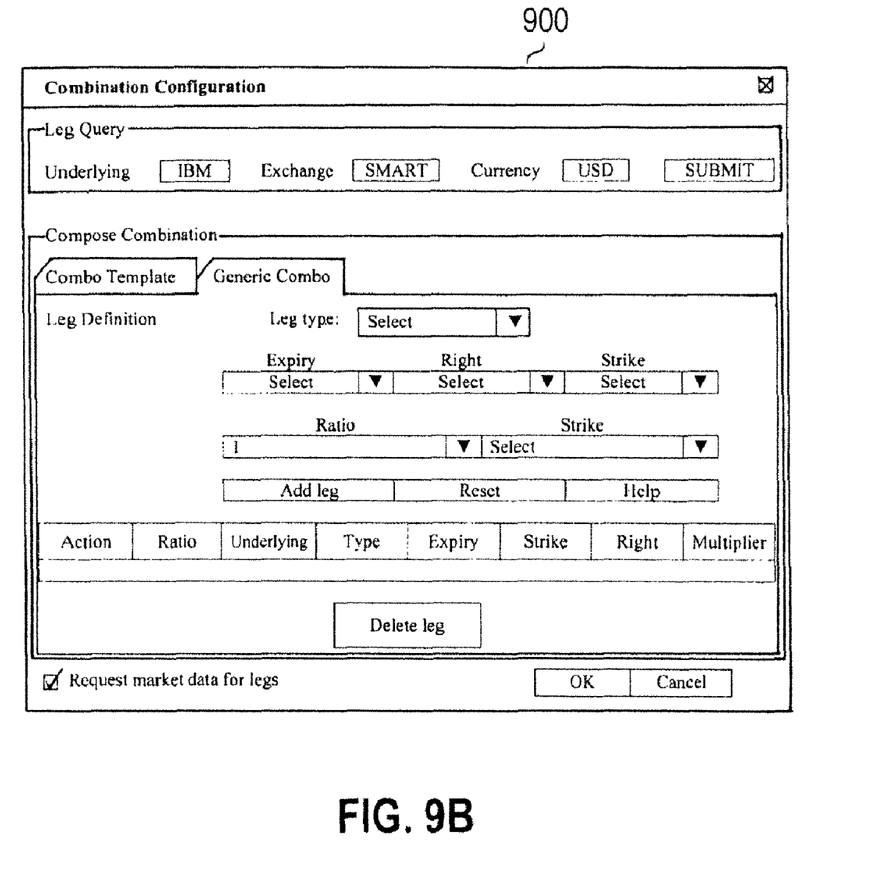

FIG. 9A illustrates a combination order creation user interface, and FIG. 9B shows an enlarged user interface 900 shown in FIG. 9A. This example illustrates the user interface that the trader may see on the TWS. The interface is flexible and gives a trader a multitude of options and a great degree of flexibility in designing a combination order with respect to two or more underlying instruments. In the illustrated embodiment, the user can also refer to a set of 13 pre-designed choices that specifically address a certain trading strategy making it easier for a trader to design a combo order by using a template.

Figure 10:
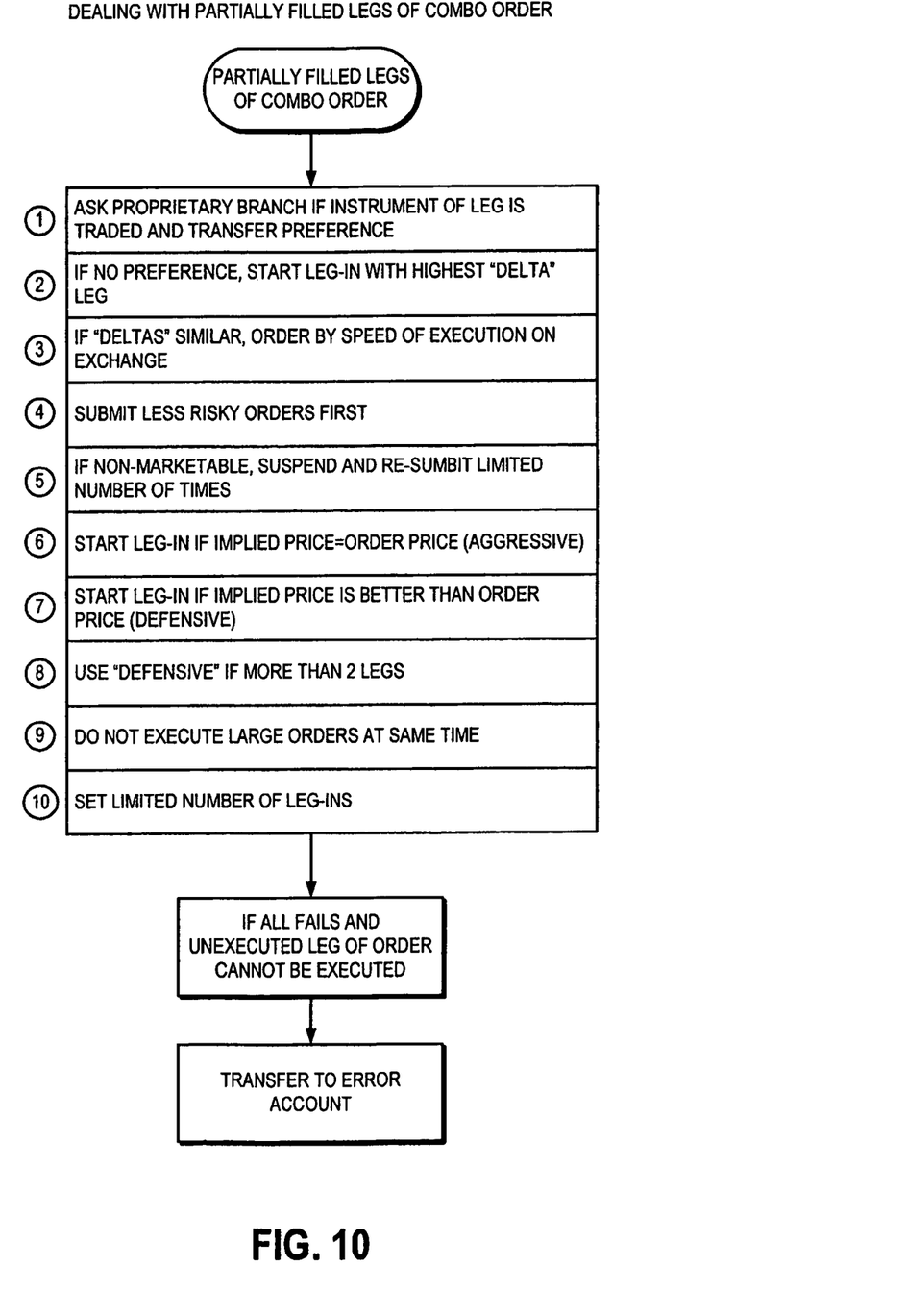
FIG. 10 illustrates the handling of partially filled legs of a combination order.

FIG. 10 illustrates the handling of partially filled legs of a combination order. In the event that a combo order did not execute on a native exchange, the trading system will follow a certain algorithm for "legging-in" a portion of an order to a different exchange or a trading venue. The trading system follows this procedure because in the event that a portion of a trade is not executed, the owner of the trading system will be responsible for the already executed portion of the combo order.

Figure 11:
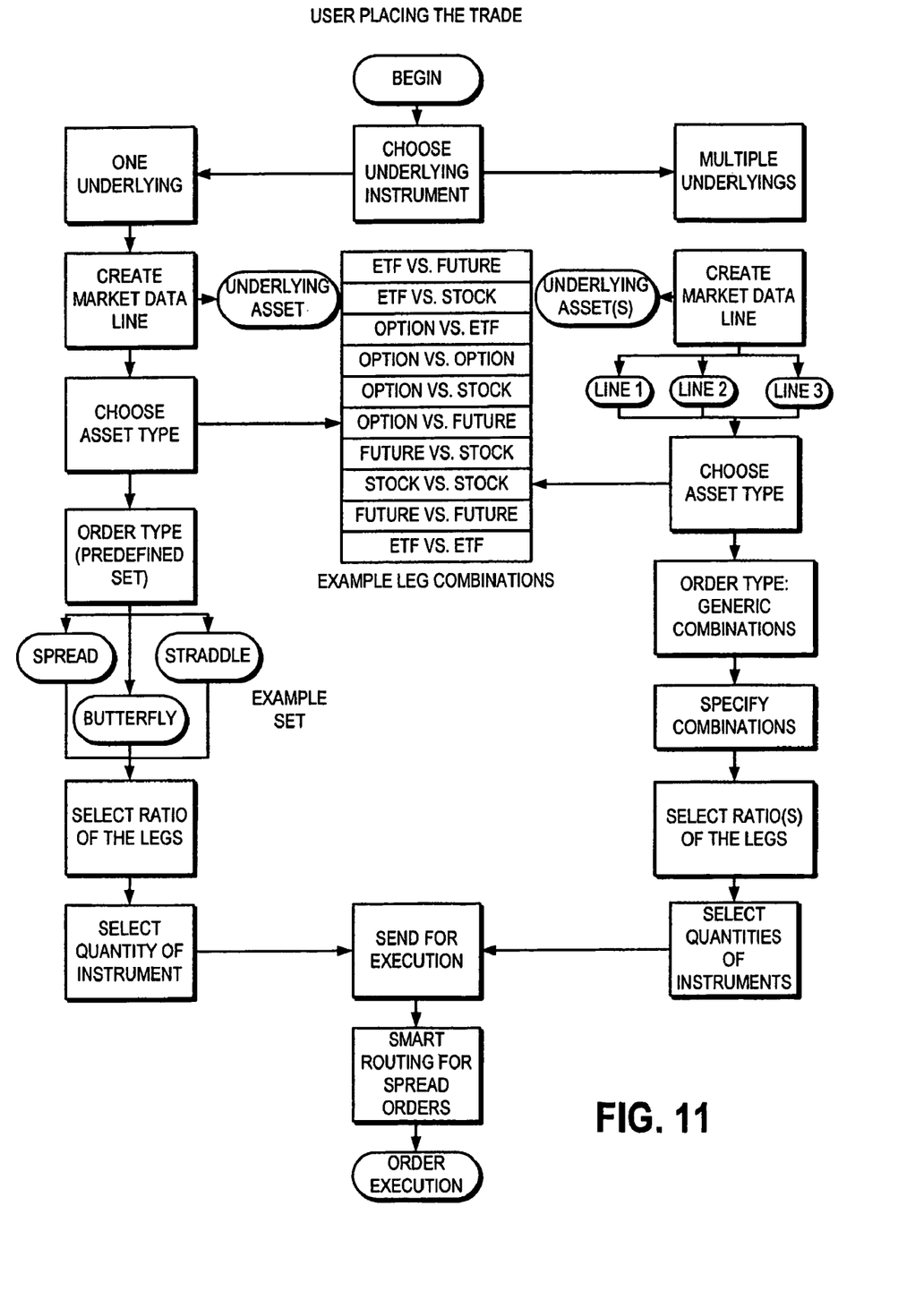
FIG. 11 illustrates a user placing a trade.
Figure 12:
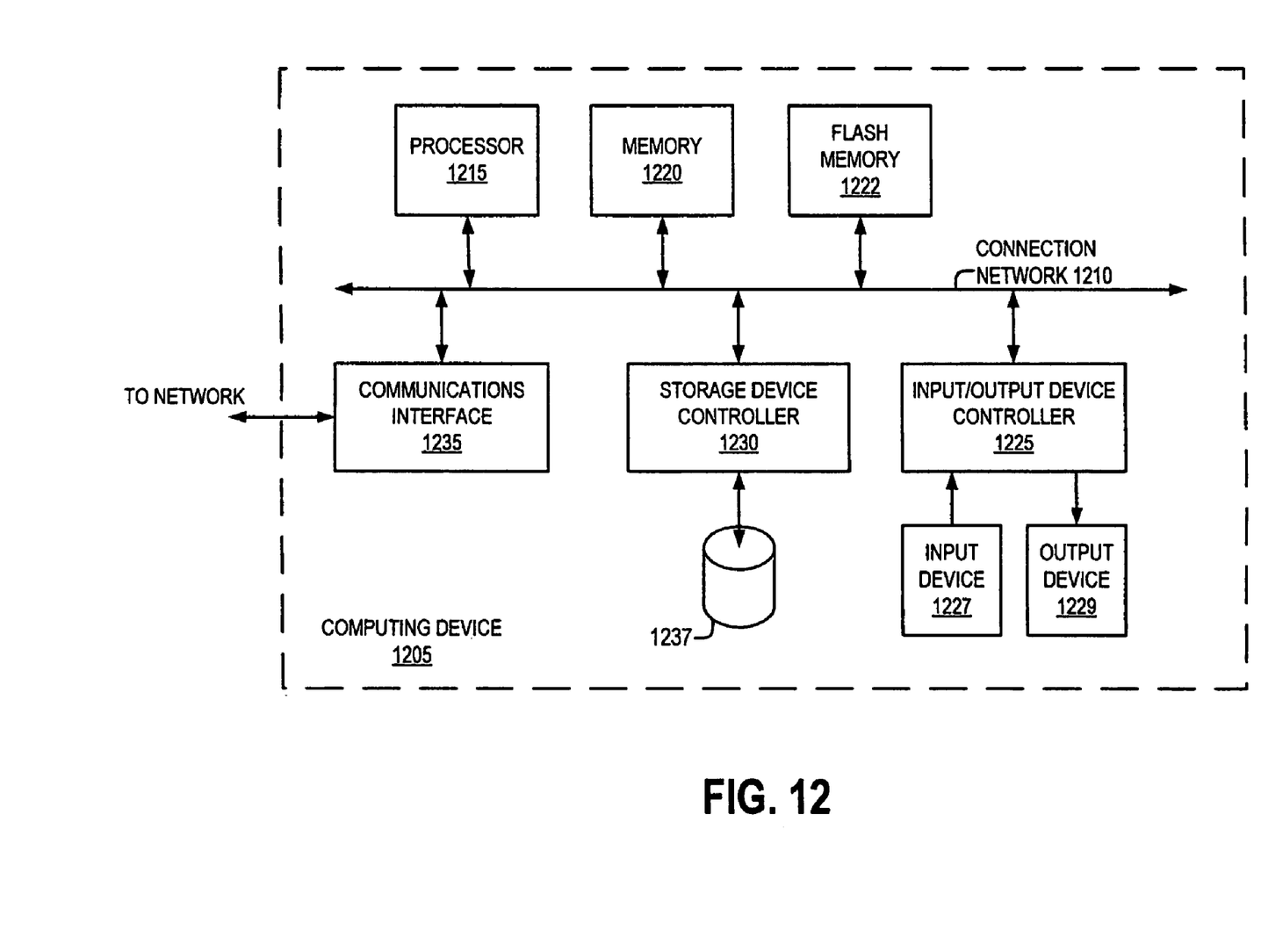
FIG. 12 illustrates a computing device for implementing an embodiment of the present disclosure.

FIG. 11 illustrates a user placing a trade. This exhibit goes into the details of what decisions a typical trader will have to make in order to structure a combo order. For example, a trader will have to decide whether the order will refer to one or two or more underlying assets. Once the decision is made, a trader can conveniently choose the subject asset from an asset database and place the asset in the order interface. Next, the trader will decide what instruments will be included in the combo order, for example, if this would be a call option versus a put option, or a company stock versus a futures contract on the same or other stock. Next, as discussed above, a trader can pick the type of the combo order from a list of possible combination (e.g., spread, butterfly, straddle) or alternatively select a certain strategy. For example, if a trader believes that the market in a certain asset, such as IBM stock, is going to decline, the trader will design a combo order that will protect him or her from such decline.

B. Detailed Description of The Trading System's Aspects

Purpose of Disclosed Embodiments of the Invention. The present disclosure provides a trader (i.e., a client or user of a trading system) a method of creating an inter-market combination product (combo), receiving market data, placing orders, executing orders using a smart routing algorithm, and viewing the execution results.

Composition of the Combo Order. The combo can be composed of any United States exchange traded stock, option, and future legs with the same or different underlying, ratio, and side (buy or sell) for each component product (leg). The client created combo can be traded at exchange which has native combo support (native combo exchange). It can also be a combo which no exchange trades it. The system can handle both combo seamlessly.

Assigning a Multiplier. To follow the convention of derivative product, the combo created by client will have a combo multiplier. If the combo is composed of legs which have the same multiplier, it will use the leg multiplier as the combo multiplier. If the legs of a combo have different multipliers, the system will calculate a combo multiplier and the client will be notified the value of the combo multiplier. For example:

A combo of two US option legs with option multiplier of 100 for both legs will have a combo multiplier of 100.
  A combo of two US stock legs will have a combo multiplier of 1.
  A combo of one US stock leg and one US option with multiplier of 100 will have a combo multiplier of 100. A combo of one US option leg with multiplier of 100 and one US future leg with multiplier of 2500 will have a combo multiplier of 100.

A combo of one US future leg with multiplier of 12500, a second leg of future with multiplier of 20, and third leg of option with multiplier of 100 will have a combo multiplier of 20.

In certain embodiments, the choice of adequate multiplier is important because it determines the scale of the price the customer enters with his order.

Smart Combo Tick and Calculation of Implied Price. In order to support smart routing of the combo order, the system has a smart combo tick component. It consolidates both implied combo prices and native combo prices (If combo has native exchange) to provide the system with the best combo price for smart routing. The native combo price is the actual combo order price placed at native exchanges. The implied combo price is the calculated combo price using leg prices and combo definition. More specifically, it is the total cost of combo order using current leg prices divided by combo order size and then divided by the combo multiplier, or Implied Combo Price=Total cost of the order/combo order size/ combo multiplier.

The Best Combo Price. The system uses the best leg prices it has collected to calculate the implied combo prices. The best price among all native combo prices and implied combo price is used as the best combo price. On TWS, the inventor's client software, different colors are used to display the combo prices to let the client side know where the best combo price comes from.

Submission of the Order to the Native Exchange. If the combo order can be traded at a native exchange, it will be routed to the native exchange and stays there if the order is non-marketable or the order becomes marketable at the exchange by its price (implied or outright) and the price is the best combo price at the moment. By doing this, the client order gets visible to all interesting parties and has a better chance of execution as native combo order. The system continuously evaluates the changing market condition and when it detects that the best combo price is implied price and it has a chance to fill the combo order by sending leg orders independently to exchange(s), it will cancel the combo order from the native exchange and try to execute the order by sending individual leg orders independently to exchange(s) at which the best leg price exists (leg-in). If the combo order cannot trade at any native exchange, the system will accept the order like an electronic exchange, send acknowledgement conforming to FIX standard, and keep watching implied combo price until it can start leg-in the order.

Legging-In the Combo Order at Another Exchange. To leg-in the combo order of more than one option legs, the system also checks if the consecutive leg orders will be governed by the exchange. The system will only start leg-in orders if all the option leg orders can be submitted to the relevant exchange(s) without violating the regulation.

Partially Filled Leg Trades. When the system leg-in the combo order and when it fails to get all the leg filled due to the changing market condition, it will transfer the partially filled leg executions to an error account which belongs to the system owner. The client is transparent of the transfer activity and guaranteed that its combo order is either executed fully or partially as a whole, i.e. the executed order will have all the legs executed at the proper ratio defined in the combo.

Consolidated Reports. The same combo order can be filled partially at native exchanges and by leg-in. The system consolidates all executions from different venues, generates proper execution reports for combo order as well as legs, and sends them to the client side. The client will have clear records of how and where the combo order is actually filled.

Owner of the System Takes the Risk of Partially Filled Orders. As mentioned above, the partially filled leg transaction during leg-in is transferred to the owner of the system. The leg-in success rate becomes very important for the actual usage of the invented technology due to the obvious risk of carrying the results of failed (transferred) transactions by the owner. Following measures are used to improve the leg-in success rate and reduce the carrying risk:

Determine the order in which the legs will be executed:
If the proprietary branch of the business trades the items, ask it to sort the legs by the preference of which leg the branch would prefer to get transferred should we fail to execute the combination.

If there is no strong preference between the legs, start with the leg that has the highest delta—i.e. the fastest moving item.

If the deltas are similar, order the legs in terms of the target exchange. (Some exchanges execute faster than others).

If the proprietary branch does not trade the items, order them in terms of the adjusted bid-ask spread adjusted by the delta. (The idea is that the tightest quote is likely to vanish first, hence we should start with it).

Calculate the risks of leg orders and submit the leg orders with less risky one first.

Start leg-in when the implied combo price equals the order price (aggressive leg-in). If the system fails a couple of allowed times, e.g. 3 times, for the same client order, the system will leg-in the order only when the implied combo price is better than the order price (defensive leg-in).

Always use defensive leg-in strategy for order of more than 2 legs.

For the client order of large quantity, don't leg-in the whole quantity at one time. Instead, the system will route the leg order with proper quantity once at a time to fill the whole combo order gradually.

Set maximum allowed leg-in limit to prevent drastic risk. If the same order has gone through too many leg-in failures, the system won't continue to leg-in anymore to protect the owner of the system.

Non-Marketable vs. Marketable Orders. If the order is submitted as non-marketable at submission and market condition changes to make the order marketable. The order will either stay if already submitted or be routed to the native exchange if the native exchange has the best combo price, or the system will wait for some time, e.g. 1 second, to start leg-in. This is to avoid leg-in failure of rapid abnormal leg price fluctuations. For example, a combo buy order is submitted with limit price of $84.45 and the combo bid/ask are at $84.40/84.5 at that time. Such order is not marketable and will be routed to the native exchange. When the combo bid/ask change to $84.35/84.45, the order now becomes marketable and will stay or be routed to the native exchange if the native exchange has the best price, i.e. has the ask price of $84.45. If the native exchange does not have the best bid price of $84.45, the system will wait for 1 second and if combo implied price remains the same or becomes better than $84.45 after 1 second, it will start leg-in.

C. Computing Device

FIG. 12 is a diagram illustrating a computing device. A computing device is generally an efficient way of implementing the features or functions disclosed herein. In the examples described above, a computing device is used to implement the features of the trading platform, such as electronic order submission, routing, and execution.

In the illustrated embodiment, the computing device 1205 includes a connection network 1210, a processor 1215, a memory 1220, a flash memory 1222, an input/output device controller 1225, an input device 1227, an output device 1229, a storage device controller 1230, and a communications interface 1235. Also included is an internal storage device 1237.

The connection network 1210 operatively couples each of the processor 1215, the memory 1220, the flash memory 1222, the input/output device controller 1225, the storage device controller 1230, and the communications interface 1235. The connection network 1210 can be an electrical bus, switch fabric, or other suitable interconnection system.

The processor 1215 is a conventional microprocessor (e.g., single core or multiple cores). The processor 1215 executes instructions or program code modules from the memory 1220 or the flash memory 1222. The operation of the computing device 1205 is programmable and configured by the program code modules. Such instructions may be read into memory 1220 or the flash memory 1222 from a computer readable medium, such as a device coupled to the storage device controller 1230.

Execution of the sequences of instructions contained in the memory 1220 or the flash memory 1222 cause the processor 1215 to perform the method or functions described herein. Although a single computing device is shown, one skilled in the art will appreciate that the functionality described herein may be implemented using a component software architecture (e.g., Java 2 Enterprise Edition) and distributed among a plurality of computing devices. In alternative embodiments, hardwired circuitry may be used in place of or in combination with software instructions to implement aspects of the disclosure. Thus, embodiments of the disclosure are not limited to any specific combination of hardware circuitry and software. The memory 1220 can be, for example, one or more conventional random access memory (RAM) devices. The flash memory 1222 can be one or more conventional flash RAM devices, or electronically erasable programmable read only memory (EEPROM) devices. The memory 1220 may also be used for storing temporary variables or other intermediate information during execution of instructions by processor 1215.

The input/output device controller 1225 provides an interface to the input device 1227 and the output device 1229. The output device 1229 can be, for example, a conventional display screen. The display screen can include associated hardware, software, or other devices that are needed to generate a screen display. The illustrated embodiment also includes an input device 1227 operatively coupled to the input/output device controller 1225. The input device 1227 can be, for example, an external or integrated keyboard or cursor control pad.

The storage device controller 1230 can be used to interface the processor 1215 to various memory or storage devices. In the illustrated embodiment, the internal storage device 1237 is shown for storing software applications (e.g., a complex order routing system), user data, system configuration, and the like. As one skilled in the art will appreciate, the internal storage device 1237 can be any suitable storage medium, such as magnetic, optical, or electrical storage.

The communications interface 1235 provides bidirectional data communication coupling for the computing device 1205. The communications interface 1235 can be functionally coupled to a local area or wide area network. In one embodiment, the communications interface 1235 provides one or more input/output ports for receiving electrical, radio frequency, or optical signals and converts signals received on the port(s) to a format suitable for transmission on the connection network 1210. The communications interface 1235 can include a radio frequency modem and other logic associated with sending and receiving wireless or wireline communications. For example, the communications interface 1235 can provide an Ethernet interface, Bluetooth, and/or 802.11 wireless capability for the computing device 1205.

Having described embodiments of inter-market smart-routing for combination spread order trading (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

The invention claimed is:

1. A computer-implemented method for routing combination orders, the method comprising:
   receiving by a computer, from a user, a combination order having at least first and second legs;
   receiving by the computer, from the user, order specifications;
   determining by the computer whether the combination order is marketable;
   determining by the computer whether the combination order can be traded on a native exchange or whether on several exchanges;
   if the combination order can be traded on the native exchange, routing by the computer the first leg and the second leg to the native exchange;
   if the combination order can not be traded on the native exchange, routing by the computer the first leg to a first exchange and routing the second leg to a second exchange;
   determining by the computer whether the first leg and the second leg execute on user's terms, and determining that the combination order is a partially executed order where one of the first and second legs is executed and the other leg is not executed; and
   sending by the computer the partially executed order to an error account, the error account having no detrimental effect to an account of the user such that the user is not charged for the executed leg.

2. The method of claim 1, wherein the first exchange and the second exchange represent different exchanges.

3. The method of claim 1, wherein the method further comprises:
   assigning a multiplier reflecting a risk to the combination order based on the first leg and the second leg.

4. The method of claim 1, wherein the order specifications include at least one of: a type of order, an underlying asset, an amount, a price (the spread/the ratio), a strike or a exercise, a term, and a type of trading order.

5. The method of claim 1, wherein the first leg is a stock, option, ETF, or future and the second leg is a stock, option, ETF, or future.

6. The method of claim 1, wherein determining whether the first and the second leg execute comprises:
   calculating the native spread with respect to orders submitted to a native exchange or implied spread with respect to orders submitted to other than native exchanges; and
   evaluating whether the combination order has been fully or partially filled.

7. The method of claim 1, wherein determining whether the combination order is marketable comprises:
   sending at least one of the first and the second leg of the combination order to a native exchange if the combination order is non-marketable and if such order continues to be non-marketable, sending for legging-in; and if the combination order is non-marketable, sending the order to the error account.

8. The method of claim 1, wherein determining whether the combination order did not execute fully comprises:
sending at least one of the first and the second leg of the combination order to a native exchange if the combination order is non-marketable and if such order continues to be non-marketable, sending for legging-in; and
if the combination order cannot be executed fully, sending the partially executed order to the error account.

9. The method of claim 1, further comprising:
accounting for the combination order, in an account of the user, as a single trade.

10. The method of claim 7, wherein further comprising when the combination order is sent for legging-in, starting with one of the first and second legs that has the highest delta.

11. The method of claim 8, wherein further comprising when the combination order is sent for legging-in, starting with one of the first and second legs that has the highest delta.

12. The method of claim 1, further comprising:
generating by the computer a report for the combination order, and outputting the report to an output device.

13. The method of claim 1, further comprising:
determining a best native combo price for the first leg and second leg;
determining a best implied combo price for the first leg and second leg;
determining which of the best native combo price and the best implied combo price is a better price; and
routing the combination order based on the better price.

14. A trading system for routing combination orders, comprising:
a processor; and to
a memory having a program,
the processer communicating with the memory to execute the program to perform as:
a receiver configured to receive, from a user, a combination order having at least first and second legs, wherein the combination order includes order specifications;
an order analyzer, in communication with the receiver, configured to determine whether the combination order is marketable and whether the combination order can be traded on a native exchange or whether on several exchanges;
an order router configured to, if the combination order can be traded on the native exchange, route the first leg and the second leg to the native exchange, and if the combination order can not be traded on the native exchange, route the first leg to a first exchange and the second leg to a second exchange;
an execution analyzer configured to determine whether the first leg and the second leg execute on user's terms, and to determine that the combination order is a partially executed order where one of the first and second legs is executed and the other leg is not executed; and
an error detector, in communication with the execution analyzer, configured to send the partially executed order to an error account, the error account having no detrimental effect to an account of the user such that the user is not charged for the executed leg.

15. The system of claim 14, wherein the first exchange and the second exchange represent different exchanges.

16. The system of claim 14, wherein the processor is further programmed to perform as an assigning module configured to assign a multiplier reflecting a risk to the combination order based on the first leg and the second leg.

17. The system of claim 14, wherein the order specifications include at least one of: a type of order, an underlying asset, an amount, a price (the spread/the ratio), a strike or a exercise, a term, and a type of trading order.

18. The system of claim 14, wherein the first leg is a stock, option, ETF, or future and the second leg is a stock, option, ETF, or future.

19. The system of claim 14, wherein the execution analyzer is further configured to:
calculate the native spread with respect to orders submitted to a native exchange or implied spread with respect to orders submitted to other than native exchanges; and
evaluate whether the combination order has been fully or partially filled.

20. The system of claim 14, wherein determining whether the order analyzer is further configured to:
send at least one of the first and the second leg of the combination order to a native exchange if the combination order is non-marketable and if such order continues to be non-marketable, send for legging-in; and
if the combination order is non-marketable, send the combination order to the error account.

21. The system of claim 14, wherein determining whether the execution analyzer is further configured to:
send at least one of the first and the second leg of the combination order to a native exchange if the combination order is non-marketable and if such order continues to be non-marketable, send for legging-in; and
if the combination order cannot be executed fully, send the partially executed order to the error account.

22. The system of claim 14, wherein the processor is further programmed to performs as an account database configured to account for the combination order, in an account of the user, as a single trade.

23. The system of claim 14, further comprising:
a price determiner, in communication with the order analyzer, configured to:
determine a best native combo price for the first leg and second leg;
determine a best implied combo price for the first leg and second leg;
determine which of the best native combo price and the best implied combo price is a better price; and
the order router further configured to route the combination order based on the better price.

24. The system of claim 20, wherein further comprising when the order analyzer is further configured to, when sending the combination order for legging-in, starting with one of the first and second legs that has the highest delta.

25. The system of claim 21, wherein further comprising when the order analyzer is further configured to, when sending the combination order for legging-in, starting with one of the first and second legs that has the highest delta.

26. The system of claim 14, further comprising:
a report generator for generating a report for the combination order, and an output device for outputting the report.

27. A non-transitory tangible computer-readable medium with executable instructions stored thereon for routing combination orders, whereupon execution of the instructions causes one or more processors to perform the steps of:
receiving, from a user, a combination order having at least first and second legs;
receiving, from the user, order specifications;
determining whether the combination order is marketable;

determining whether the combination order can be traded on a native exchange or whether on several exchanges;

if the combination order can be traded on the native exchange, routing the first leg and the second leg to the native exchange;

if the combination order can not be traded on the native exchange, routing the first leg to a first exchange and routing the second leg to a second exchange;

determining whether the first leg and the second leg execute on user's terms, and determining that the combination order is a partially executed order where one of the first and second legs is executed and the other leg is not executed; and sending the partially executed order to an error account, the error account having no detrimental effect to an account of the user such that the user is not charged for the executed leg.

28. The computer-readable medium of claim 27, further comprising the steps of:

generating a report for the combination order, and outputting the report to an output device.

* * * * *